(12) United States Patent
Nagy

(10) Patent No.: US 12,208,653 B2
(45) Date of Patent: Jan. 28, 2025

(54) TRAILER HITCH

(71) Applicant: James Nagy, Cheboygan, MI (US)

(72) Inventor: James Nagy, Cheboygan, MI (US)

( * ) Notice: Subject to any disclaimer, the term of this patent is extended or adjusted under 35 U.S.C. 154(b) by 318 days.

(21) Appl. No.: 17/678,592

(22) Filed: Feb. 23, 2022

(65) Prior Publication Data

US 2023/0264528 A1 Aug. 24, 2023

(51) Int. Cl.
B60D 1/07 (2006.01)
B60D 1/06 (2006.01)
B60D 1/58 (2006.01)

(52) U.S. Cl.
CPC ............ B60D 1/07 (2013.01); B60D 1/06 (2013.01); B60D 1/583 (2013.01)

(58) Field of Classification Search
CPC ............ B60D 1/06; B60D 1/07; B60D 1/583
See application file for complete search history.

(56) References Cited

U.S. PATENT DOCUMENTS

| | | | | |
|---|---|---|---|---|
| 5,725,229 A * | 3/1998 | McWethy | ............... | B60D 1/07 280/491.5 |
| 6,789,815 B2 * | 9/2004 | Moss | ................. | B60D 1/06 280/491.1 |
| 7,044,494 B1 * | 5/2006 | Cowett | ................. | B60D 1/02 280/512 |
| 8,276,931 B2 * | 10/2012 | DeKarske | ............. | B60D 1/583 280/507 |
| 8,684,389 B2 * | 4/2014 | Gries | ................. | B60D 1/52 280/436 |
| 8,979,112 B2 * | 3/2015 | Weipert | ................. | B60D 1/54 280/491.5 |
| 10,005,330 B2 | 5/2018 | Nagy | | |
| 2012/0217725 A1 * | 8/2012 | DeKarske | ............... | B60D 1/46 280/511 |
| 2019/0275850 A1 * | 9/2019 | Pucheu | ................. | B60D 1/06 |
| 2023/0294467 A1 * | 9/2023 | Good | ................... | B60D 1/06 280/504 |

* cited by examiner

Primary Examiner — Kevin Hurley
(74) Attorney, Agent, or Firm — Mitchell Law PLLC; Matthew W. Mitchell

(57) ABSTRACT

A trailer hitch apparatus is disclosed. The apparatus includes a tubular receiving member, a base, an arm extending from the base, a first tow ball having a threaded shaft, and a second tow ball having a threaded opening configured to selectively couple to the threaded shaft of the first tow ball. The tubular receiving member is configured to be removably attached to a vehicle. A retainer assembly is configured to be selectively engage the first tow ball.

17 Claims, 4 Drawing Sheets

TRAILER HITCH

TECHNICAL FIELD

This disclosure relates to towing, and more particularly to a towing apparatus.

BACKGROUND

The statements in this section merely provide background information related to the present disclosure and may not constitute prior art.

Tow hitch assemblies are commonly used for the towing of trailers, and wheeled vehicles, e.g., automobile, cement mixer, recreational vehicle by another vehicle, e.g., automobile, truck, or van. Tow hitches are known to include a tow ball secured on the rear of a towing vehicle and a coupler or socket for the tow ball attached to a trailer or towed vehicle. Although it is desirable to tow different types of trailers and vehicles behind the same vehicle, different trailers and vehicles may have couplers which differ in structure and configuration and which do not fit or mate with the tow ball attached to the towing vehicle. In order to tow a trailer or a vehicle with a non-matching coupler, the tow ball must be removed and replaced with a different sized tow ball.

Therefore, a need exists for a hitch with multiple sized tow balls enabling a user to quickly change tow ball sizes for coupling to a coupler of another vehicle or trailer.

SUMMARY

A trailer hitch apparatus is disclosed. The apparatus includes a tubular receiving member, a base, an arm extending from the base, a first tow ball having a threaded shaft, and a second tow ball having a threaded opening configured to selectively couple to the threaded shaft of the first tow ball. The tubular receiving member is configured to be removably attached to a vehicle. A retainer assembly is configured to be selectively engage the first tow ball.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
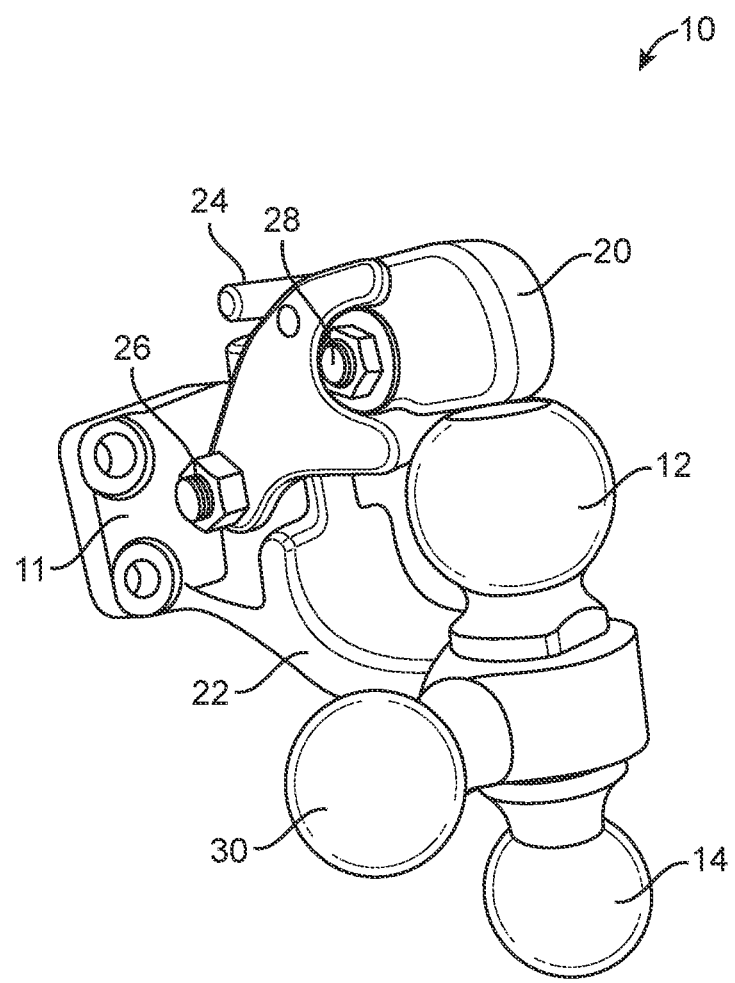
FIG. 1 is a perspective view of a hitch in a locked position, in accordance with the present disclosure.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment of figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "vehicle" includes all types of vehicles including, but not limited to, automobiles, trucks, military vehicles, airplanes, trains, etc., and also includes towed vehicles and towing vehicles.

Referring now to FIG. 1, a hitch 10, according to some embodiments of the present invention, is illustrated. The hitch 10 is configured to be mounted to a vehicle, and typically to a hitch apparatus attached to a vehicle. It is contemplated by the disclosure herein that certain embodiments of the hitch can be removably attached to any type of hitch apparatus without limitation. Moreover, embodiments of the hitch 10 can be removably attached to a vehicle in various other ways without limitation.

The hitch 10 includes a base 11 and an arm 22 that extends from the base 11. A first tow ball 12 extends from a first side of the arm 22 and a second tow ball 14 that extends from a second side of the arm 22. The first and second tow balls 12 and 14 have, in one embodiment, different sizes to accommodate trailer couplers of different sizes, as would be understood by those skilled in the art of the present invention. For example, tow ball 12 may be a two and five sixteenths (2⁵⁄₁₆") ball and tow ball 14 may be a two inch (2") diameter ball. Various combinations of tow ball sizes may be utilized in accordance with embodiments of the present invention.

In various embodiments, a third tow ball 30 may extend from a side the arm 22. In one embodiment, the third tow ball 30 is perpendicular to the extension of the first and second tow calls 12 and 14, respectively. The third tow ball 30 may be integral to the arm 22 or mechanically attached thereto, e.g., using threads.

The hitch 10 may be a single integral piece in some embodiments. In other embodiments, the hitch 10 may be two or more components secured together, for example, via welding and mechanical fasteners. In some embodiments, the tow balls 12 and 14 may be threadingly secured to the coupling apparatus arm 22. The first tow ball 12 is in an upright orientation when the base 11 is attached to a vehicle in the first position, and the second tow ball 14 is in an upright orientation when the base 11 is attached to a vehicle in the second position.

The illustrated hitch 10 also includes a retainer assembly 20 removably attachable to the base 11. The retainer assembly 20 includes a latch that is configured to retain an object (e.g., a coupler associated with a trailer or other towed vehicle) extending around the first tow ball 12. In some embodiments, the retainer assembly 20 is configured to function as a pintle hook.

The retainer assembly 20 is pivotally and removably secured to the base 11 by a mechanical fastener 26 through an opening. The mechanical fastener 26 may be a rod, a pin, a bolt, or any other type of device that can removably secure the retainer assembly 20 to the base 11 and permit rotatable movement. The latch is rotatable between open and locked positions. The retainer assembly 20 includes a lever 24 that is configured to move the latch between open and locked positions. The lever 24 includes opposite first and second end portions as shown in the figures. The illustrated lever 24 also includes a handle with opposite first and second portions, in one embodiment.

The lever 24 is positioned between the latch walls 34 and is rotatably secured to the retainer assembly 20 via a mechanical fastener 28 that extends through an opening. The fastener 28 may be a rod, a pin, a bolt, or any other type of device that can pivotably secure the lever 24 to the latch. The lever 24 is rotatable between open and locked positions. In one embodiment, a biasing element is provided to urge the lever 24 towards the locked position, as would be understood by those skilled in the art of the present invention. The biasing element can be a torsion spring with one end associated with the lever 24 and an opposite end associated with the latch. Various types of biasing elements may be utilized, however, and embodiments of the present invention are not limited to a torsion spring.

Embodiments of the present invention are not limited to the illustrated shape and configuration of the base 11 and arm 22. The base 11 and arm 22 may have various shapes and configurations without limitation.

Figure 2:
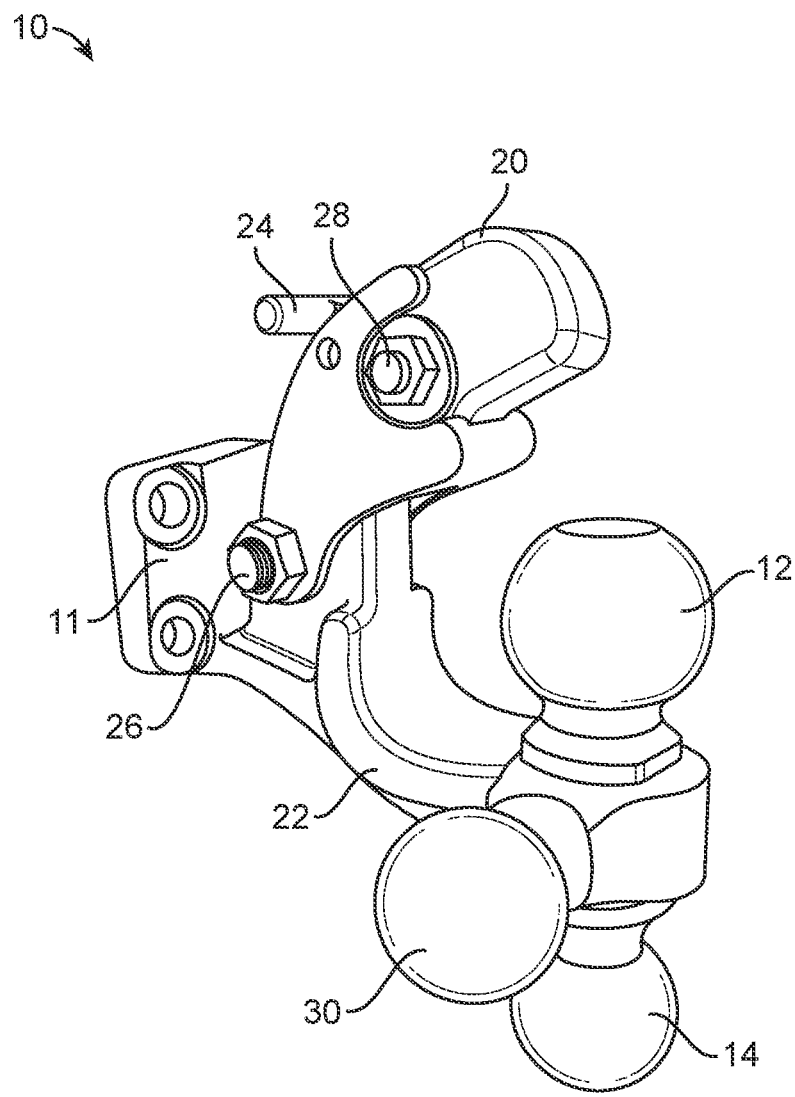
FIG. 2 is a perspective view of the hitch in an unlocked position, in accordance with the present disclosure.
Figure 3:
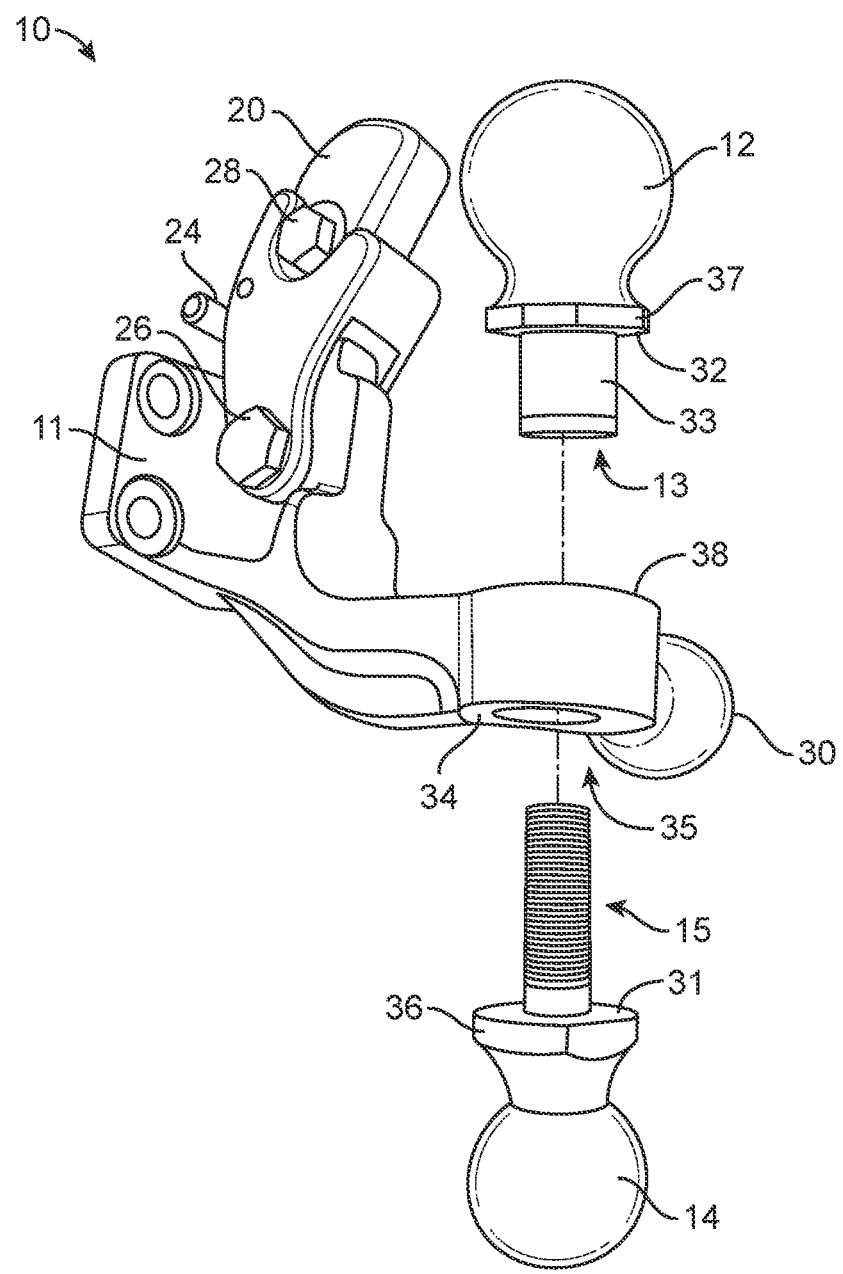
FIG. 3 is a partially exploded view of the hitch, in accordance with the present disclosure.

With specific reference to FIG. 2, the first and second tow balls 12 and 14, respectively, are shown in an exploded view. As FIG. 2 shows, the first tow ball 12 includes a shaft 33 having bored interior 13. The bored interior 13 includes a threaded inner surface including helically disposed threads. The second tow ball 14 includes a threaded shaft 15 for coupling to the threaded inner of the first tow ball 12. The arm 22 includes a cylindrical-shaped opening 35 sized to accept the shaft 15 therethrough. In one embodiment, the cylindrical-shaped opening 35 is sized to accept the shaft 33 having the bored interior 13.

The arm preferably includes opposing surfaces 34 and 38 configured to abut surfaces 31 and 32, respectively, when the first and second tow balls are secured together. The first and tow balls 12 and 14 each preferably include surfaces 37 and 36, respectively, configured to couple to a wrench, such surfaces can be octagonal-shaped.

Figure 4:
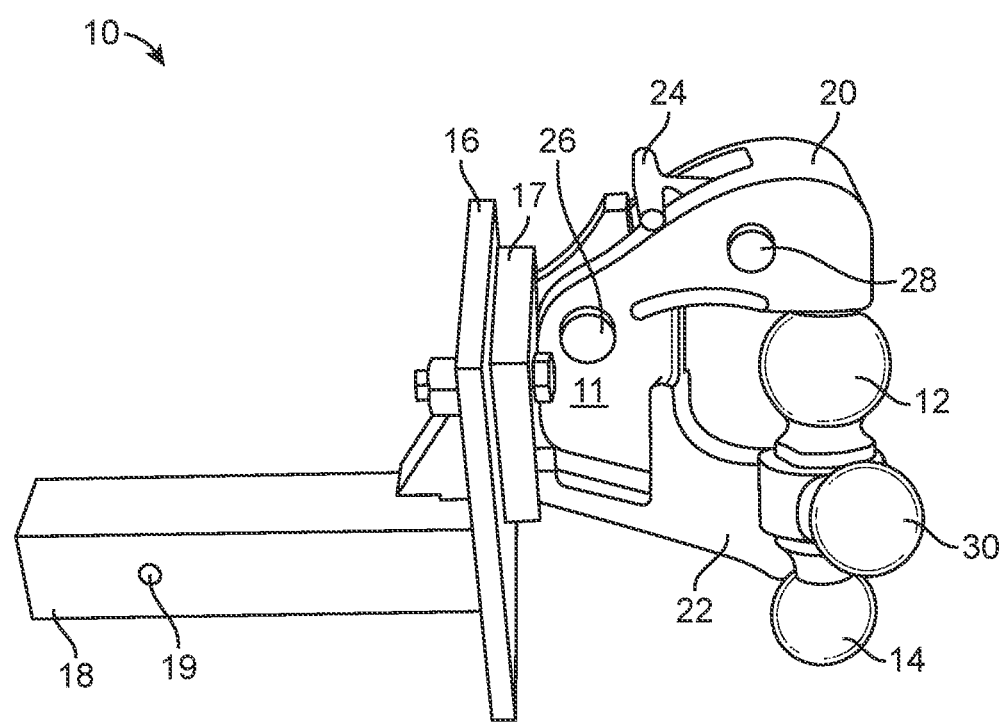
FIG. 4 is a perspective view of another embodiment of the hitch, in accordance with the present disclosure.

FIG. 4 shows an embodiment of the hitch 10 that includes a tubular receiving member 18 adapted to fit within a receiver secured to the undercarriage of a vehicle. An aperture 19 may be formed in the tubular receiving member 18 to provide a method for pinning and securing the tubular receiving member 18 within the receiver. The base 11 can be integrally or mechanically attached to a face plate 17 for mechanical attachment to a plate 16 of the tubular receiving member 18. Moreover, the tubular receiving member 18 may be removably secured to a vehicle in various ways.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention.

The invention claimed is:

1. A trailer hitch apparatus comprising:
   a base;
   an arm extending from the base;
   a first tow ball having a threaded shaft;
   a second tow ball having a threaded opening configured to selectively couple to the threaded shaft of the first tow ball;
   a retainer assembly attached to the base and configured to selectively engage the first or second tow ball; and
   a third tow ball perpendicular to the first and second tow balls.

2. The trailer hitch apparatus of claim 1, wherein the arm includes an aperture sized to receive the threaded shaft.

3. The trailer hitch apparatus of claim 2, wherein the arm includes opposing planar-shaped surfaces for abutting surfaces of the first and second tow balls.

4. The trailer hitch apparatus of claim 1, wherein the first tow ball includes surfaces configured to engage a wrench.

5. The trailer hitch apparatus of claim 1, wherein the second tow ball includes surfaces configured to engage a wrench.

6. The trailer hitch apparatus of claim 1, wherein the first and second tow balls are different sizes.

7. The trailer hitch apparatus of claim 1, further comprising a tubular receiving member configured to be removably attached to a vehicle, wherein the member comprises an aperture configured to receive a pin.

8. A trailer hitch apparatus comprising:
a base;
a first tow ball having a threaded shaft;
a second tow ball having a shaft with a bored threaded opening configured to selectively couple to the threaded shaft of the first tow ball;
an arm extending from the base, wherein the arm includes an aperture sized to receive the shaft with the bored threaded opening, wherein the arm includes opposing planar-shaped surfaces for abutting surfaces of the first and second tow balls;
a retainer assembly attached to the base and configured to selectively engage the first or second tow ball; and
a third tow ball perpendicular to the first and second tow balls.

9. The trailer hitch apparatus of claim 8, wherein the first tow ball includes surfaces configured to engage a wrench.

10. The trailer hitch apparatus of claim 8, wherein the second tow ball includes surfaces configured to engage a wrench.

11. The trailer hitch apparatus of claim 8, wherein the first and second tow balls are different sizes.

12. The trailer hitch apparatus of claim 8, further comprising:
a tubular receiving member configured to be removably attached to a vehicle, wherein the member comprises an aperture configured to receive a pin.

13. A trailer hitch apparatus comprising:
a base;
a first tow ball having a threaded shaft, wherein the first tow ball includes an octagonal-shaped portion having planar surfaces configured to engage a wrench;
a second tow ball having a shaft with a bored threaded opening configured to selectively couple to the threaded shaft of the first tow ball, wherein the second tow ball includes an octagonal-shaped portion having planar surfaces configured to engage a wrench, wherein the first and second tow balls are different sizes;
an arm extending from the base, wherein the arm includes an aperture sized to receive the shaft with the bored threaded opening, wherein the arm includes opposing planar-shaped surfaces for abutting surfaces of the first and second tow balls; and
a retainer assembly attached to the base and configured to selectively engage the first or second tow ball.

14. The trailer hitch apparatus of claim 13, further comprising: a third tow ball perpendicular to the first and second tow balls.

15. The trailer hitch apparatus of claim 14, further comprising:
a tubular receiving member configured to be removably attached to a vehicle, wherein the member comprises an aperture configured to receive a pin.

16. The trailer hitch apparatus of claim 15, wherein the retainer assembly is removably and pivotably attached to the base and wherein the retainer assembly and the first tow ball are formed to function selectively as a pintle hook.

17. The trailer hitch apparatus of claim 16, wherein the retainer assembly further includes a lever configured to control a latch configured to retain an object and wherein the retainer assembly is pivotably secured to a perpendicular plate integral to the second plate via a mechanical fastener engaged through an aperture of the perpendicular plate and an aperture of the base.

* * * * *